Patented Nov. 17, 1936

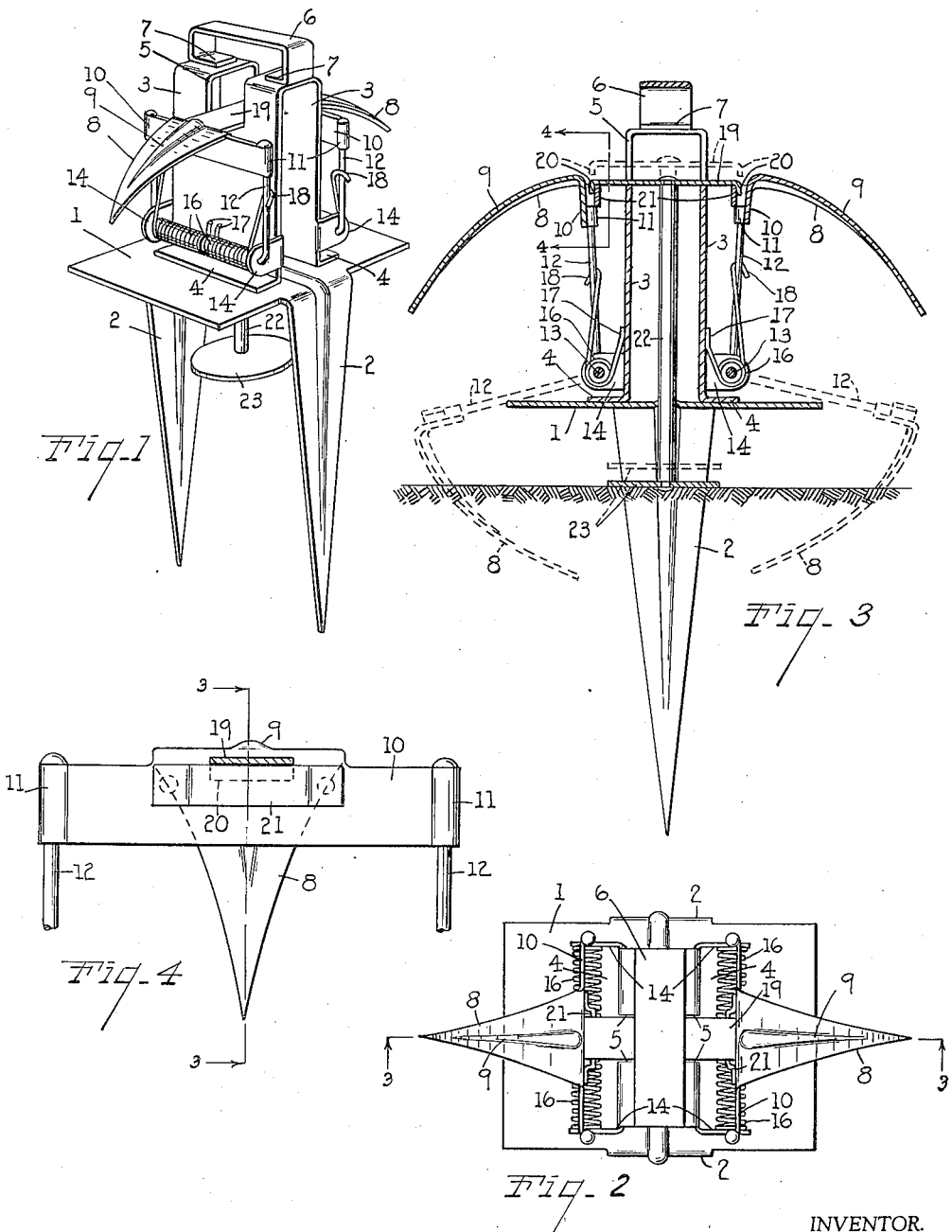

2,060,947

UNITED STATES PATENT OFFICE 2,060,947

MOLE TRAP

James Dwight Morrow, Benton Harbor, Mich.

Application December 23, 1935, Serial No. 55,872

6 Claims. (Cl. 43—79)

The objects of this invention are,

First, to provide a mole trap having improved impaling prongs for penetrating the ground to engage the mole.

Second, to provide a cheap construction of trap made largely of stampings.

Third, to provide an improved trip means for such a trap.

Fourth, to provide improved support and springs for the impaling prongs.

Objects pertaining to details of construction and operation will appear from the detailed description to follow. I accomplish the objects of the invention by the trap described in the following specification and illustrated in the drawing, in which:

Fig. 1 is a perspective view of my improved trap as it appears set with the impaling prongs raised ready for action before the trap is forced into the ground.

Fig. 2 is an enlarged plan view of the trap appearing in Fig. 1.

Fig. 3 is a vertical sectional elevation taken on line 3—3 of Figs. 2 and 4, the tripped position of the release and the projection of the impaling prongs into the ground being indicated by dotted lines.

Fig. 4 is an enlarged detail sectional view taken on line 4—4 of Fig. 3, showing details of construction of the trap.

The parts will be identified by their numerals of reference which are the same in all the views.

1 is the base plate and 2, 2 are the supporting prongs formed from a stamping integral therewith and adapted to penetrate the ground on each side of the burrow of the mole as a support for the trap. The base 1 is provided with the upright central support 3, preferably of a stamping, which is flanged at 4 and secured to the base 1 by spot welding or any suitable means. A vertical guiding notch 5 is formed in the folded material of the support for guiding the trip. A handle 6 is provided which is secured by spot welding or riveting at 7 to the end part of the upright support 3.

8, 8 are a pair of impaling prongs which are of stampings tapering to a point at each side and are reinforced by central ribbing 9 and formed on the arc of a circle so that they penetrate the ground readily. These prongs, while preferably formed of stampings as indicated, may be formed of any suitable material that conforms with the outline indicated. The prong is provided with a cross arm support 10 integral therewith, which is turned into eyes 11 around pivoted arms 12 at each side. These are upturned portions of a central pivot rod 13 which is disposed in ears 14 formed integral with the support 3 or attached thereto. The pivot rods 13 carry coiled springs 16, one end 17 of which contacts with the support and the other end 18 engages one of the arms 12. These are the means that actuate the impaling prongs and drive them into the ground when the trap is sprung.

These prongs are held in the set position by the trip bar 19 which has down-turned ends 20 that engage into loops 21 on the prong cross arms. The trip bar 19 is connected centrally with the vertical tripping rod 22 which is guided in the base 1 and bears the pan or pedal 23 which is forced into contact with the ground above the burrow of the mole in setting the trap.

From this description it will be seen that the trap is readily set by raising the prongs to the set position, holding the trip bar 19 down securely with the hand, and forcing the supporting prongs 2 into the ground on each side of the burrow of the mole. The pan or pedal thus is in contact with the ground. The operation is apparent. The mole in forcing its body through the ground beneath forces the trip pan 23 upwardly, releases the trip, and is impaled by the prongs, as illustrated in Fig. 3.

While I have shown the structure made mainly of stampings in its preferred form, it could be made up without the use of stampings, in which event the prongs would be otherwise formed. I desire to claim the structure formed from stampings and also to claim the same generally and broadly, as pointed out in the appended claims.

Having thus described my invention, what I claim as new and desire to secure by Letters Patent is:

1. A mole trap comprising a suitable base with downwardly-extending supporting prongs, an upwardly-projecting support on the said base, impaling prongs supported at each side formed in the arc of a circle, a pivoted support for each of said prongs above the base plate, pivoted at the center of curvature of said arc, springs for driving the said impaling prongs downwardly, a trip bar adapted to engage said prongs by downwardly-projecting lug portions, a central vertical rod for the said trip, and a trip pan at the lower end of said rod adapted to be disposed in contact with the ground.

2. A mole trap comprising a suitable base, an upwardly-projecting support on the said base, impaling prongs supported at each side formed in the arc of a circle, a pivoted support for each of said prongs above the base plate, pivoted at the center of curvature of said arc, springs for driving the said impaling prongs downwardly, a trip bar adapted to engage said prongs by downwardly-projecting lug portions, a central vertical rod for the said trip, and a trip pan at the lower end of said rod adapted to be disposed in contact with the ground.

3. A mole trap comprising a suitable base with downwardly-extending supporting prongs, an upwardly-projecting support on the said base, impaling prongs supported at each side formed in the arc of a circle, a pivoted support for each of said prongs above the base plate, pivoted at the center of curvature of said arc, springs for driving the said impaling prongs downwardly, and means to set and release said impaling prongs.

4. A mole trap comprising a suitable base formed from a stamping with downwardly-extending integral supporting prongs, an upwardly-projecting central support secured on said base formed of a stamping, impaling prongs formed of stampings supported at each side and formed in the arc of a circle, a pivoted support for each of said impaling prongs above the base plate comprising a central pivoted rod with upwardly-projecting arms, coiled springs for driving the said impaling prongs downwardly, a trip bar with downwardly-projecting lugs adapted to engage said prongs to hold the same in set position, a central vertical trip rod for the said trip bar, and a trip pan at the lower end of said rod adapted to be disposed in contact with the ground to be forced up by a passing mole.

5. A mole trap comprising a suitable base formed from a stamping with downwardly-extending integral supporting prongs, an upwardly-projecting central support secured on said base formed of a stamping, impaling prongs formed of stampings supported at each side and formed in the arc of a circle, and means to set and release said impaling prongs.

6. A mole trap comprising a suitable base formed from a stamping with downwardly-extending integral supporting prongs, an upwardly-projecting central support secured on said base formed of a stamping, impaling prongs formed of stampings supported at each side and formed in the arc of a circle, a pivoted support for each of said impaling prongs above the base plate comprising a central pivoted rod with upwardly-projecting arms, coiled springs for driving the said impaling prongs downwardly, and means to set and release said impaling prongs.

JAMES DWIGHT MORROW.